(12) United States Patent
Kim et al.

(10) Patent No.: US 7,941,650 B2
(45) Date of Patent: May 10, 2011

(54) MICROPROCESSOR BASED ON EVENT-PROCESSING INSTRUCTION SET AND EVENT-PROCESSING METHOD USING THE SAME

(75) Inventors: Young Woo Kim, Daejeon (KR); Myeong Hoon Oh, Daejeon (KR); Chi Hoon Shin, Daejeon (KR); Sung Nam Kim, Daejeon (KR); Seong Woon Kim, Daejeon (KR); Myung Joon Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 295 days.

(21) Appl. No.: 12/155,833

(22) Filed: Jun. 10, 2008

(65) Prior Publication Data

US 2009/0113178 A1    Apr. 30, 2009

(30) Foreign Application Priority Data

Oct. 29, 2007 (KR) ........................ 10-2007-0109206

(51) Int. Cl.
*G06F 9/30* (2006.01)
*G06F 9/46* (2006.01)
(52) U.S. Cl. .................................... 712/221; 712/244
(58) Field of Classification Search .................. 712/221, 712/244
See application file for complete search history.

(56) References Cited

U.S. PATENT DOCUMENTS

| | | | | | |
|---|---|---|---|---|---|
| 5,694,587 | A | * | 12/1997 | Webb et al. ................. | 712/224 |
| 5,729,728 | A | * | 3/1998 | Colwell et al. .............. | 712/234 |
| 6,289,465 | B1 | * | 9/2001 | Kuemerle .................... | 713/300 |
| 6,842,812 | B1 | * | 1/2005 | Roth et al. ................... | 710/262 |
| 7,334,114 | B2 | * | 2/2008 | Sohm et al. .................. | 712/227 |
| 2004/0187040 | A1 | | 9/2004 | Sasagawa | |
| 2006/0075210 | A1 | | 4/2006 | Manohar et al. | |
| 2007/0038795 | A1 | * | 2/2007 | Kadomaru .................... | 710/315 |

FOREIGN PATENT DOCUMENTS

| | | |
|---|---|---|
| EP | 0931287 B1 | 8/2001 |
| JP | 2004-295193 | 10/2004 |
| KR | 10-2004-0069277 | 8/2004 |

OTHER PUBLICATIONS

Virantha N. Ekanayake et al., "BitSNAP: Dynamic Significance Compression for a Low-Energy Sensor Network Asynchronous Processor", *Proceedings of the 11$^{th}$ IEEE International Symposium on Asynchronous Circuits and Systems (ASYNC '05)*, (11 pages).
Korean Office Action issued on Apr. 29, 2009 in corresponding Korean Patent Application 10-2007-0109206.

* cited by examiner

*Primary Examiner* — Daniel Pan
(74) *Attorney, Agent, or Firm* — Staas & Halsey LLP

(57) ABSTRACT

Provided are a microprocessor based on event-processing instruction set and an event-processing method using the same. The microprocessor includes an event register controlling an event according to an event-processing instruction set provided in an instruction set architecture (ISA) and an event controller transmitting externally generated events into the microprocessor. Therefore, the microprocessor may be useful to reduce its unnecessary power consumption by suspending the execution of its program when an instruction decoded to execute the program is an event-processing instruction, and also to cut off its unnecessary power consumption that is caused for an interrupt delay period since the program of the microprocessor may be executed again by immediately re-running the microprocessor with the operation of the event register and the event controller when external events are generated.

10 Claims, 4 Drawing Sheets

MICROPROCESSOR BASED ON EVENT-PROCESSING INSTRUCTION SET AND EVENT-PROCESSING METHOD USING THE SAME

CROSS-REFERENCE TO RELATED APPLICATIONS

This application claims the priority of Korean Patent Application No. 10-2007-109206 filed on Oct. 29, 2007 in the Korean Intellectual Property Office, the disclosure of which is incorporated herein by reference.

BACKGROUND OF THE INVENTION

1. Field of the Invention

The present invention relates to a microprocessor capable of realizing low power consumption in various information appliances (portable, sensor node, etc.), and more particularly, to a microprocessor architecture based on an event-processing instruction set provided in an instruction set architecture (ISA) that is able to operate with low power consumption as a core element of various information appliances, an event-processing method using the same.

2. Description of the Related Art

A microprocessor is one of the core components of information appliances that have been used in the field of various applications. Information appliances have increasingly become miniaturization, high-performance and low-power in recent years, and there has been an increasing demand for various techniques and technologies for minimizing power consumption due to the limits on the small portable information appliances and their battery technologies. Among them, a microprocessor has been designed using various low-power techniques since the microprocessor may be used as a core component for information process.

In the case of the conventional low-power techniques, general microprocessors have been used to reduce power consumption by decreasing an externally applied power supply voltage or reducing an operating clock rate to operate the microprocessors at low power (Dynamic Voltage Frequency Scaling: DVFS), and they have also been used to further reduce power consumption by interrupting clocks or power sources to blocks that are not necessary to operate any more.

However, the above-mentioned methods requires the time and complicated controls for the changes in the power supply voltage or the operating clock rate, also have limits in reducing the power consumption since the minimum power supply voltage or clock should be used for a period when the microprocessors waits to process predetermined internal or external events although the power supply voltage is decreased and the clock rate is reduced.

Also, a global clock used in the synchronous circuit and system designs is provided in all memory devices in the system, and therefore the dynamic power consumption is always caused due to the increased capacitive load by the use of clock wires and the signal transition by the supply of the clock signal, which accounts for some of the entire power consumption.

Therefore, the above-mentioned method has a limit in reducing the power consumption when the method is used in the synchronous microprocessors although the method is applicable through the various techniques and complicated controls.

As an alternative, EP0931287 B1 (Title: "Asynchronous Data Processing Apparatus") filed by ARM (England) and Manchester University discloses a microprocessor that operates without the use of global clocks through the application of the asynchronous circuit and system design methodologies so as to solve the low-power-associated problem as described above.

For the European patent, the microprocessor may operate at low power by preventing the increased wires of global clocks and thus the increase in capacitive load since the global clocks are not used in the microprocessor, and also cutting off the power consumption according to the clock transition caused even when the microprocessor does not operate.

Also, the microprocessor may be realized at low power by halting some circuits of the microprocessor if the operation of the circuits is not necessary when the operation of the program in the microprocessor is completed through the instruction "HALT" for halting operation of a microprocessor in an instruction set architecture (ISA) of the microprocessor.

However, for the above-mentioned method, the microprocessor may operate again by receiving external hardware interrupts, analyzing the received interrupts, and processing an operation based on the analysis of the interrupts using a software, and therefore it is difficult to define the kinds and characteristics of the external interrupts. Also when external interrupts are generated, the microprocessor should analyze the external interrupts using its software, and take its operation according to the analyzed external interrupts.

Therefore, the conventional microprocessors have a problem that, although unnecessary interrupts are generated in the operation of the microprocessors, the microprocessors should be certainly re-run to confirm the generation of the interrupts and take their operation.

As another alternative, US Patent No. 2006/0075210 A1 (Title: "Sensor-Network Processors Using Event-Driven Architecture") filed by Rajit Manohar from Cornell University (US) proposes a configuration of a microprocessor capable of its preventing power consumption by the unnecessary operation of a microprocessor when the microprocessor is in waiting state to process internal or external events after the operation of the microprocessor is completed normally.

For the configuration and method proposed in the US patent, when necessary operations of the microprocessor are completed, the microprocessor executes the instruction "DONE" instruction (identical to the instruction "HALT" in the European patent) to halt the operation of the microprocessor, generates an event token through a timer and a message coprocessor, both of which function to process unnecessary events, when the unnecessary events are generated in the microprocessor, and re-execute its corresponding operation when there is an generated token.

The method proposed in the US patent may be used to effectively reduce the power consumption in the microprocessor when the asynchronous circuit and system design methodologies apply to the microprocessor, but has a problem that various coprocessors and queues should be used to generate an event token that is necessary to re-operate the microprocessor when the operation of the microprocessor comes to a halt.

In the case of the above-mentioned methods, the microprocessor should be necessarily re-operated to confirm the generation of interrupts and takes its operation even when the generated interrupts are irrelevant to the execution of programs in the microprocessor, which leads to the additional power consumption. Also, the size and volume of a circuit may be increased since various coprocessors and queues should be used to generate an event token that is necessary to re-operate the microprocessor when the operation of the microprocessor comes to a halt.

SUMMARY OF THE INVENTION

The present invention is designed to solve the problems of the prior art, and therefore it is an object of the present invention to provide a microprocessor based on an event-processing instruction set that is provided in an instruction set architecture to control an operation of the microprocessor according to the events generated internal or external the microprocessor, and includes an event controller and an event register, both of which function to selectively suspend or re-operate the operation of the microprocessor according to the event-processing instruction.

According to an aspect of the present invention, there is provided a microprocessor based on an event-processing instruction set including an instruction memory storing a program designed with an instruction set architecture provided with an event-processing instruction set; an instruction fetcher fetching instructions for executing the program from the instruction memory; an instruction decoder decoding the fetched instruction and suspending the program execution of a microprocessor being now executed when the decoded instruction is an event-processing instruction; an instruction execution unit executing the decoded instruction; a register file composed of at least one event register and a general register to store information on the transmission of events and the event processing priority; and an event controller re-running the microprocessor to process the events on the basis of the information in the registers in the generation of the events.

According to an aspect of the present invention, there is provided an event-processing method using a microprocessor based on an event-processing instruction set, the event-processing method including: setting an initial environment of the microprocessor; performing an initial task according to the set initial environment; performing the setting of events to be used when the initial task is completed; executing a program of the microprocessor according to the order of fetched instructions when the setting of the events is completed; suspending the program of the microprocessor and waiting for the generation of a new event by turning the program of the microprocessor into an environment where the microprocessor accepts the events when the event-processing instruction is fetched and executed during the execution of the program; processing the events through a predetermined event handler of an event handler table when the events are generated, depending on the delivery of the events and the event processing priority; and waiting for the generation of a new event by executing the next event-processing instruction when the next event-processing instruction is generated after the completed processing of the event.

Here, the waiting of the generation of events may include: suspending all operations of the microprocessor after all the instructions being now executed is completely executed by executing the event-processing instruction.

Also, the processing of the events may include: re-running the microprocessor that has been in a waiting state when the events are generated.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
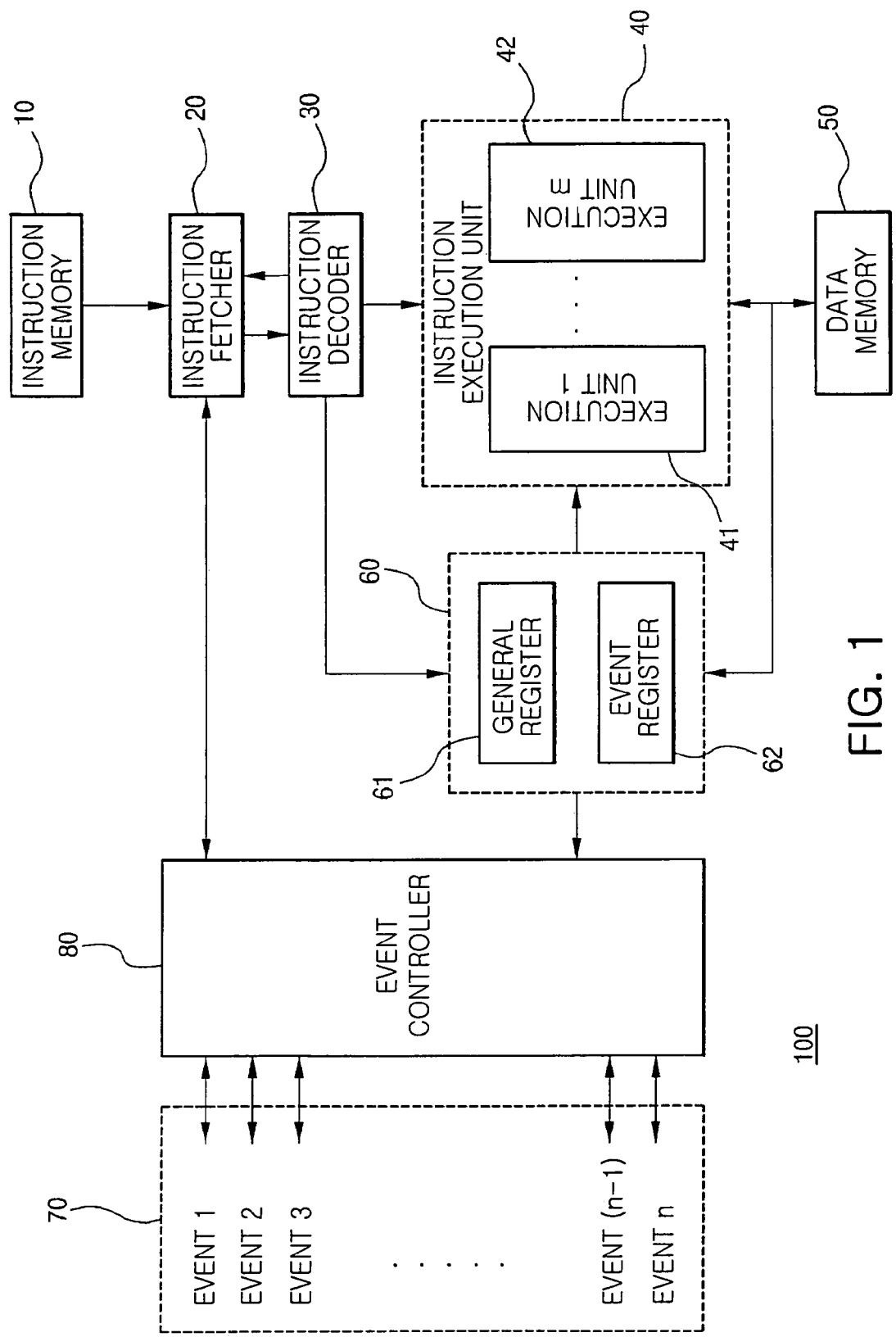
FIG. 1 is a block view illustrating a microprocessor based on an event-processing instruction set according to one exemplary embodiment of the present invention.

Exemplary embodiments of the present invention will now be described in detail with reference to the accompanying drawings. Therefore, it is considered that the present invention may be easily devised as apparent to those skilled in the art to which the present invention belongs.

For the detailed description of the present invention, it is considered that descriptions of known components and their related configurations according to the exemplary embodiments of the present invention may be omitted since they are judged to make the gist of the present invention unclear.

Also, it is considered that parts that have the similar or substantially identical functions and effects in the accompanying drawings have the same reference numerals.

In addition, when it is considered that one part is "connected to" another part(s) throughout the specification, this does not mean only a case of "directly connected to" but also a case of "indirectly connected to" while interposing another device(s) therebetween.

Also, it is considered that to "includes" one element means that the apparatus does not exclude other elements but may further include other elements, unless otherwise indicated.

Also, the terms as used herein will be defined, for the purpose of better understanding of the present invention, prior to describing the specification of the present invention, as follows.

The term 'interrupt' means an internal or external condition (or a signal) that is generated in the midterm when a microprocessor normally operates, thereby suspending the operation flow of a program and executing a predetermined operation according to the generated conditions.

The term 'event' means an internally or externally generated condition (or a signal) that waits to execute the next expected operation or is expected to be generated when the normal operation of a microprocessor is completed and halted.

Therefore, it is considered that the above-mentioned event may be referred to as a kind of interrupt according to the predetermined conditions where the time of event generation is expected or able to be known, but does not suspend an operation flow of a normal program.

FIG. 1 is a block view illustrating a microprocessor based on an event-processing instruction set according to one exemplary embodiment of the present invention.

Referring to FIG. 1, the microprocessor 100 includes an instruction memory 10, a data memory 50, an instruction fetcher 20, an instruction decoder 30, an instruction execution unit 40 including a plurality of execution units 41 and 42, a register file 60 including a general register 61 and an event register 62, and an event controller 80 for controlling internally or externally generated events.

The general operation of the microprocessor 100 according to the present invention gets started through the application of external power source or the cancellation of the reset of the microprocessor.

Then, the instruction fetcher 20 fetches an instruction for executing an program from the instruction memory 10 and transmits the fetched instruction to the instruction decoder 30. A program is stored in the instruction memory 10, the program being written using an instruction set architecture provided with an event-processing instruction set.

The instruction decoder 30 decodes the instruction transmitted from the instruction fetcher 20 and transmits the decoded instruction to the instruction execution unit 40.

The instruction execution unit 40 executes the decoded instruction through a corresponding execution unit of a plurality of the execution units 41 and 42. In this case, the instruction execution unit 40 executes a general program processing operation of reading data from the data memory 50 or storing the data, when necessary.

When the instruction decoder 30 decodes the instruction fetched from the instruction memory 10 and the instruction fetcher 20 recognizes that the decoded instruction is an event-processing instruction, the instruction decoder 30 requests the instruction fetcher 20 to halt additional fetching of the instruction, and the instruction fetcher 20 suspends the next fetching of the instruction according to the request of the instruction decoder 30 and waits for an event request from the event controller 80.

The instruction execution unit 40 terminates an executing according operations while suspending the instruction fetching, and the microprocessor 100 then suspends all operations and comes to a waiting state since instructions are not transmitted from the instruction fetcher 20.

In this waiting state, the event controller 80 processes an event 70 that is generated from the outside of the core microprocessor 100, generates an event request signal and transmits the generated event request signal to the instruction fetcher 20.

That is to say, when an event-processing request is generated from the event controller 80, the instruction fetcher 20 fetches an instruction corresponding to the event that has been generated through an event handler (not shown) corresponding to the requested event, and starts processing of the generated event. The event handler has been previously registered in an event handler table.

And, the register file 60 provides information on the transmission of events and the event processing priority so that the event controller 80 can process the generated event 70. An operation of the register 60 and the event controller 80 will be described in detail with reference to FIG. 2.

As described above, when the microprocessor according to one exemplary embodiment of the present invention uses an event-processing instruction set provided in an instruction set architecture (ISA) to process an internal or external event, and performs a predetermined operation according to the internal or external event, the operation of the microprocessor automatically comes to a halt by executing an event-processing instruction. Then, the microprocessor may be selectively re-run when a new internal or external event is generated.

Now, a relation of the event register 62 and the event controller 80 in the processing of the generated event will be described in detail with reference to FIG. 2.

Figure 2:
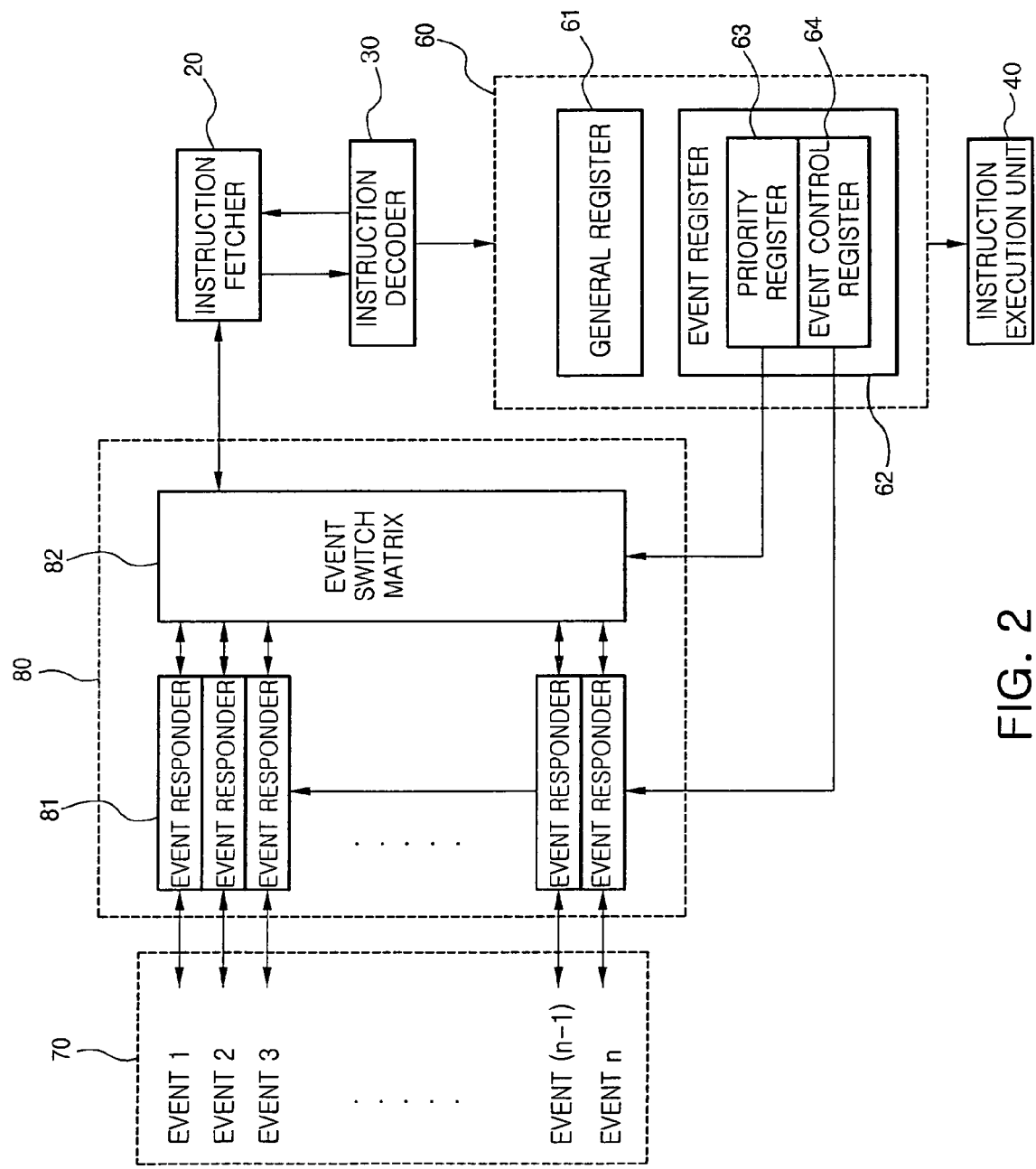
FIG. 2 is a schematic block view illustrating an event controller and an event register according to one exemplary embodiment of the present invention.

FIG. 2 shows a schematic configuration of an event register 62 and an event controller 80 according to one exemplary embodiment of the present invention. Here, the event register 62 basically includes an event priority register 63 and an event control register 64, but may further include components in addition to the event priority register 63 and the event control register 64, when necessary. However, there is no particular limitation on a configuration of the event register 62.

Meanwhile, the event controller 80 is composed of event responders 81 controlled by the event register 62 and an event/switch matrix 82, but there is no particular limitation on configuration and implementation methods of the event controller 80.

According to the operation of the event controller 80, the event responder 81 is connected to an external event request apparatus (not shown) and an event control register 64, and when an event 70 is generated from the external event request apparatus, the event responder 81 determines whether to transmit the generated event into the microprocessor with reference to the event control register 64.

That is to say, when the processing of the generated event 70 is not accepted in the event control register 64, the event responder 81 does not introduce the generated event 70 into the microprocessor, but immediately responds to the generated event 70 in the event responder 81 itself. Therefore, the event responder 81 responds to the generated event 70 as if the generated event 70 is processed, and therefore the response to the corresponding event 70 is denied in the microprocessor.

On the contrary, the event responder 81 transmits the generated event 70 to the event/switch matrix 82 when the processing of the corresponding event is accepted in the event control register 64.

In order to transmit an event transmitted from the event responder 81 to the instruction fetcher 20 and process the corresponding event, the event/switch matrix 82 fetches an instruction for an event processing program from the instruction memory 10, and completes the processing of the generated event by producing an event process response.

That is to say, the event/switch matrix 82 processes the events transmitted from the respective event responders 81, depending on the event priority as defined in the event priority register 63, and transmits the processed events to the instruction fetcher 20.

In other words, when a plurality of events are generated at the same time, the event/switch matrix 82 first transmits the highest priority event to the instruction fetcher 20, depending on the event priority as defined in the event priority register 63.

In this case, the lower priority events among the simultaneously generated events wait for the complete processing of the highest priority event, and the simultaneously generated events are sequentially transmitted and processed in the instruction fetcher 20 with the execution of the next event-processing instruction after the processing of the highest priority event is completed.

Figure 3:
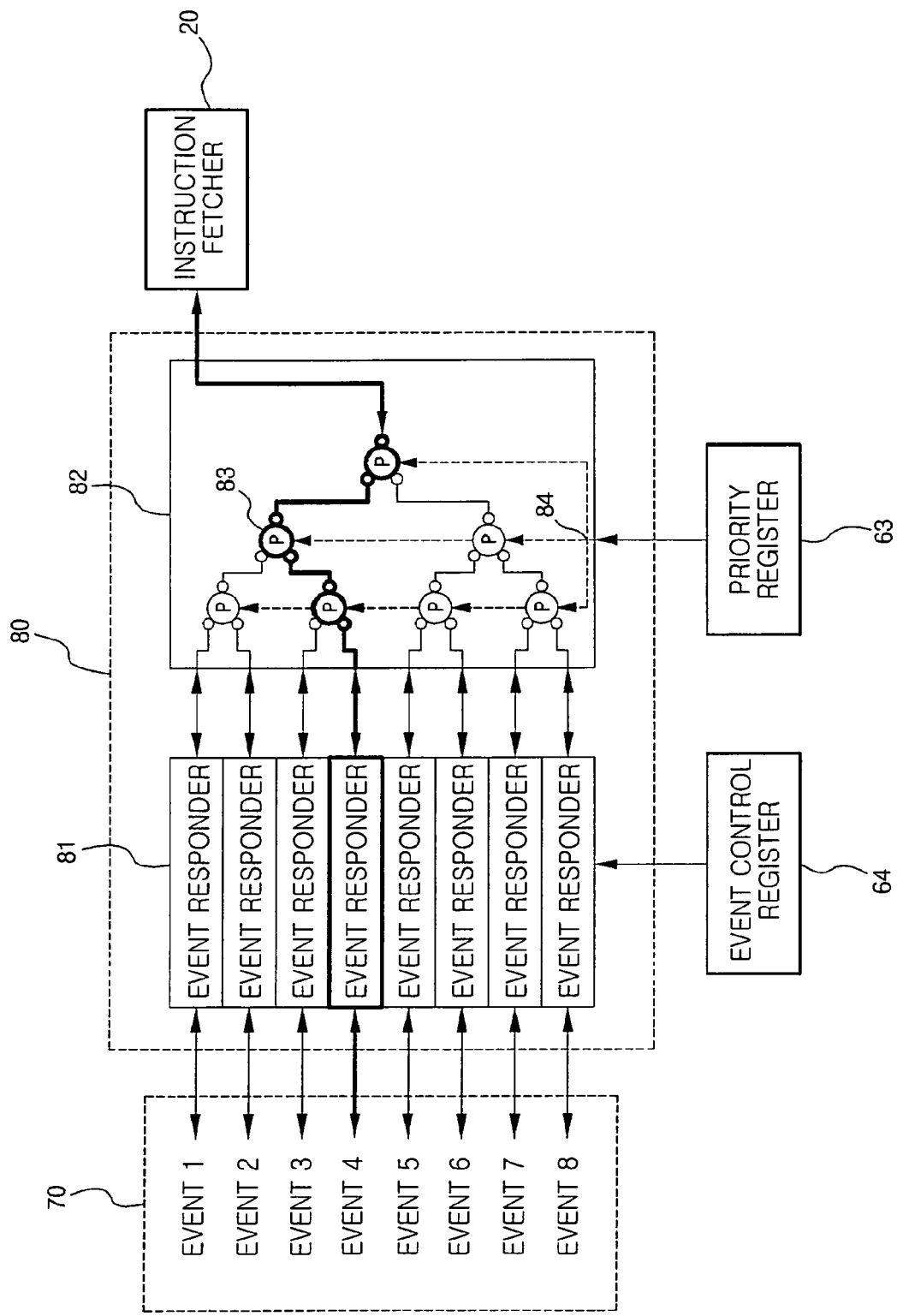
FIG. 3 is a perspective view illustrating an event-processing path of the event controller and the event register according to one exemplary embodiment of the present invention.

FIG. 3 is a perspective view illustrating a path and an operation in which an event generated in the event controller 80 is processed according to one exemplary embodiment of the present invention. Here, assume that 8 external events are generated.

Referring to FIG. 3, the event/switch matrix 82 transmits an event to the instruction fetcher 20 according to the event priority that is determined using priority control signals 84 that are transmitted from the priority controller 83 and the event priority register 63.

More particularly, when an event 4 is generated by an external event request apparatus, the event responder 81 transmits the event 4 to the event/switch matrix 82 under the control of the event control register 64.

Then, the event/switch matrix 82 determines the transmission sequence of the transmitted event 4 using the priority control signal 84 of the priority controller 83, depending on the event priority as defined in the event priority register 63.

When the event priority of the generated event 4 is the highest priority event, or other events are not generated, the event/switch matrix 82 immediately transmits the generated event 4 to the instruction fetcher 20. An event transfer path of the event 4 in the event controller 80 is represented by a thick line.

For reference, Table 1 lists the event priority of events in the event/switch matrix 82 according to one exemplary embodiment of the present invention. Here, an event 1 has the highest priority and an event 8 has the lowest priority when the priority encoding of the event is represented by 000b.

On the contrary, an event 8 has the highest priority and an event 1 has the lowest priority when the priority encoding of the event is represented by 111b.

TABLE 1

Event Priority

| Priority Encoding | Event Priority |
|---|---|
| 000b | event1 > event2 > event3 > event4 > event5 > event6 > event7 > event8 |
| 001b | event5 > event6 > event7 > event8 > event1 > event2 > event3 > event4 |
| 010b | event3 > event4 > event1 > event2 > event7 > event8 > event5 > event6 |
| 011b | event7 > event8 > event5 > event6 > event3 > event4 > event1 > event2 |
| 100b | event2 > event1 > event4 > event3 > event6 > event5 > event8 > event7 |
| 101b | event6 > event5 > event8 > event7 > event2 > event1 > event4 > event3 |
| 110b | event4 > event3 > event2 > event1 > event8 > event7 > event6 > event5 |
| 111b | event8 > event7 > event6 > event5 > event4 > event3 > event2 > event1 |

The actual implementation of the events in the event responder 81, the event/switch matrix 82 and the priority controller 83 according to the event priority as shown in FIG. 3, and the number of the events as listed in Table 1 may be realized in various manners, but there is no particular limitation on the implementation method and manner.

Then, the event-processing method performed in the above-mentioned microprocessor 100 will be described in detail with reference to FIG. 4.

Figure 4:
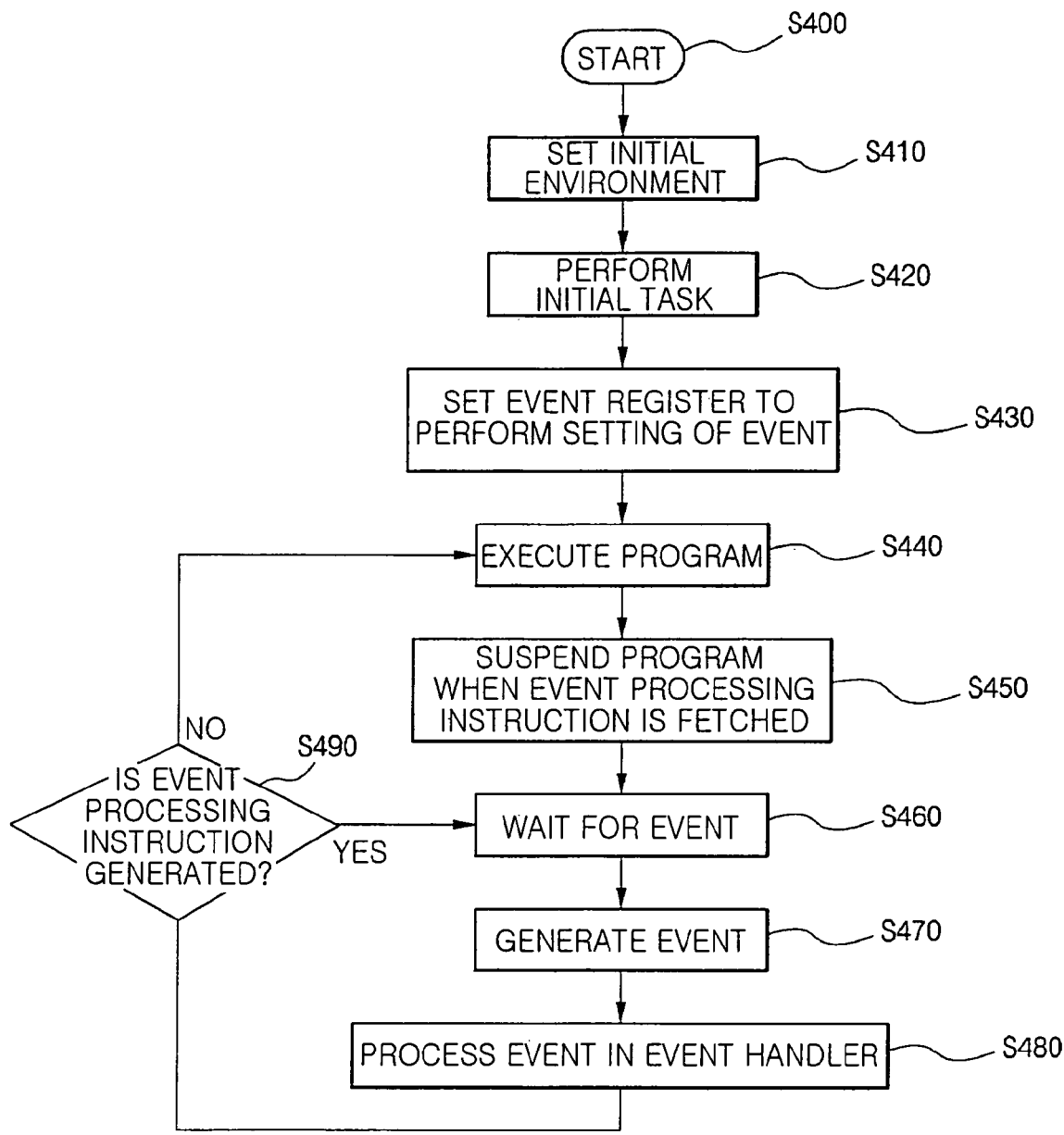
FIG. 4 is a flowchart illustrating an operation flow of the microprocessor based on an event-processing instruction set according to one exemplary embodiment of the present invention.

FIG. 4 is a flowchart illustrating an event processing procedure in the microprocessor 100 based on an event-processing instruction set according to the present invention.

First, the microprocessor 100 based on an event-processing instruction set according to the present invention gets started through the application of external power source or the cancellation of resetting (S400).

And, when an initial power source is applied to the microprocessor 100, an initial environment of the microprocessor 100 and software are set (S410), and a necessary initial task is performed under the set initial environment (S420).

Then, the microprocessor 100 whose initial task is completed performs the setting of events to be used by setting the transmission and processing priority of the events to the event register 62 (S430). This operation (S430) may be omitted in the use of a status value of an initial register that is set in hardware.

Subsequently, the microprocessor 100 executes a program according to the order of instructions stored in the instruction memory 10 (S440).

When an event-processing instruction is fetched during the execution of the program in the microprocessor 100, the microprocessor 100 turns the program of the microprocessor into an environment where the microprocessor 100 executes an event-processing instruction to accept the events, and then suspends the operation of the microprocessor (S450). This suspending of the operation of the microprocessor 100 means halting of the execution of the program of the microprocessor rather then halting of an infinite loop by the program as in the general interrupt processing.

That is to say, the microprocessor 100 waits for an event-processing request with minimized power consumption without performing the subsequent unnecessary instruction execution operation (S460).

When an event is generated from the outside of the microprocessor 100 (S470) in the waiting state (S460), the generated event is supplied to the instruction fetcher 20 through the event controller 80, depending on the transmission permission of the event transmitted from the event register 62, and the processing priority signal.

Subsequently, the instruction fetcher 20 initiates an event processing through a corresponding event handler (not shown) registered in an event handler table that is set in resetting a program for the transmitted event (S480).

Therefore, the microprocessor 100 processes the corresponding event (S480), and executes a normal program (S440) when an event-processing instruction is not generated (S490) after the processing of the corresponding event is completed. On the contrary, the microprocessor 100 executes an event-processing instruction again and waits in a waiting state until the next event reaches the microprocessor 100 (S460) when the event-processing instruction is generated (S490).

Here, when an event is generated and starts to be processed through a corresponding event handler, a response to the event processing (S480) is transmitted to the outside according to the characteristics of the event to be processed, which makes it possible to process the next event, or the response may be generated in the time point when the event processing (S480) is completed or generated when a new event-processing instruction is executed. However, there is no particular limitation on the actual implementation method.

Table 2 lists the minimum event-processing instruction sets according to one exemplary embodiment of the present invention. Here, there is no particular limitation on the implementation of the event-processing instruction sets, but various event-processing instruction sets may be further used herein.

TABLE 2

Event-processing Instruction Set

| Instruction | Operand | Arithmetic Operation |
|---|---|---|
| PEVT | Immediate Value | Setting of Event Priority Register |
| MEVT | Immediate Value | Setting of Event Control Register |
| EVT | — | Accepting of All Events and Processing of the Highest Priority Event among the Events |
| EVT | Immediate Value | Selecting and Processing of Predetermined Events among the Events |
| NEVT | Immediate Value | Processing of All Events Except for Predetermined Events |
| DEVT | — | Event Processing Completed |

With reference to Table 2, as the basic instructions used in the exemplary embodiments, PEVT represents an instruction for setting a priority value to an event priority control register, and MEVT represents an instruction for setting an event control register to selectively receive events to be used. Theses PEVT and MEVT instructions may be realized with general register read/write instructions.

For the event-processing instruction set as the heart of the present invention, EVT that does not use the operand first represents an instruction for waiting for generation of all events that are received by the MEVT, waiting for the highest priority event among the all received events and processing the highest priority event.

Secondly, EVT that uses the operand represents an instruction for waiting for its operation until an event to be assigned in the operand occurs. In this case, the EVT is an instruction that may exclude operations through unnecessary events to realize an additional low-power operation by receiving only corresponding events except for the unnecessary events, when a user recognizes an event to be generated.

And, NEVT represents an instruction that is used as the opposite instruction to the EVT instruction that uses the operand when a user recognizes that the assigned event is not used. In this case, the NEVT is an instruction for receiving and processing the other received events except for the assigned events.

Finally, DEVT is an instruction that may be selectively used to make a response to an event. In this case, the DEVT clearly represents an instruction for informing the event controller 80 of the completed processing of the event.

Meanwhile, one exemplary embodiment of the present invention is related to a microprocessor based on an event-processing instruction set using an asynchronous circuit and system design methodology.

The asynchronous circuit and system design methodology is a design methodology that may inherently minimize power consumption of the microprocessor, and is characteristic of such a situation that power is consumed only in elements where an event is actually processed by using a handshaking technique using response signals and a request between processing elements without use of global clocks.

The microprocessor based on an event-processing instruction set realized with the above-mentioned asynchronous circuit and system design methodology does not further generate a request signal when the event-processing instruction is fetched and decoded to halt an operation of the microprocessor, and therefore the microprocessor may stop its own internal operation without help from additional control circuits. In this case, since the asynchronous circuit and system design methodology does not use a global clock, the power consumption is not caused due to the transfer to the global clock as in the synchronous circuit and system design methodologies.

Therefore, the microprocessor based on an event-processing instruction set using the asynchronous circuit and system design methodology may be useful to minimize its power consumption and perform the event processing most effectively.

Meanwhile, another exemplary embodiment of the present invention is related to a microprocessor based on an event-processing instruction set by using at least one asynchronous circuit and system design methodology selected from the group consisting of a dynamic voltage frequency scaling methodology (DVFS), a power gating methodology (PG) and a clock gating methodology (CG) together with the synchronous circuit and system design methodology.

The synchronous circuit and system design methodology has a disadvantage that power consumption is high since its internal circuits operate incessantly by using a global clock. In order to solve the above problem, a power source is cut off to execution unit circuits after an event-processing instruction is executed, and the operation circuits wait until the next event is generated by using at least one asynchronous circuit and system design methodology selected from the group consisting of a dynamic voltage frequency scaling methodology (DVFS), a power gating methodology (PG) and a clock gating methodology (CG) together with the synchronous circuit and system design methodology. Therefore, it is possible to reduce the power consumption of the microprocessor.

Here, the dynamic voltage scaling is a methodology for reducing power consumption of related circuits by applying a low power supply voltage and changing frequency to the circuits having low operating speed, and the power gating is a methodology for interrupting a power supply to circuits that are not used for an extended time. The clock gating is a methodology for halting an operation of circuits, and thus reducing their power consumption by suspending the supply of a global clock while supplying power to the circuits that are not used for a predetermined time.

Therefore, the microprocessor based on event-processing instruction set according to the present invention using at least one asynchronous circuit and system design methodology selected from the group consisting of a dynamic voltage frequency scaling methodology (DVFS), a power gating methodology (PG) and a clock gating methodology (CG) together with the synchronous circuit and system design methodology may suspend its further operation by suspending and changing the supply a global clock or a power source to circuits, except for the event register 62 and the event controller 80, whose operations are stopped after the event-processing instruction is fetched and decoded, and may re-operate by supplying a global clock or a power source to the circuits according to the event processing status.

As described above, the microprocessor based on an event-processing instruction set according to one exemplary embodiment of the present invention may be useful to effectively perform only essential events since an instruction set architecture (ISA) includes an event-processing instruction set for processing internal or external events, and thus reduce power consumption in the instruction processing architecture by avoiding the use of infinite loops, or the re-running of the microprocessor for processing interrupts and the interrupt processing operation, which are used in the general interrupt processing process to receive the internal or external events.

Also, the microprocessor based on an event-processing instruction set according to one exemplary embodiment of the present invention may be useful to further reduce its power consumption by decreasing internal capacitive load through the use of a small and simple hardware.

Furthermore, the microprocessor based on an event-processing instruction set according to one exemplary embodiment of the present invention using the asynchronous circuit and system design methodologies may be useful to remove the power consumption caused by the use of a global clock since the microprocessor does not use the global clock, and to minimize power consumption of a system by avoiding event-processing operations that are not necessary to recover a power source and a clock that are necessarily used in the synchronous circuit and system design methodologies.

While the present invention has been shown and described in connection with the exemplary embodiments, it will be apparent to those skilled in the art that modifications and variations can be made without departing from the spirit and scope of the invention as defined by the appended claims.

What is claimed is:

1. A microprocessor based on an event-processing instruction set, comprising:

an instruction memory storing a program written with an instruction set architecture provided with an event-processing instruction set;

an instruction fetcher fetching instructions for executing the program from the instruction memory;

an instruction decoder decoding the fetched instruction and suspending the program execution of a microprocessor being now executed when the decoded instruction is an event-processing instruction;

an instruction execution unit stopping executing the decoded instruction if decoded instruction is an event processing instruction no more, processing the event by the instruction if an event is generated, in executing the decoded instruction;

a register file composed of at least one event register and a general register to store information on whether or not to transmit events and information of event processing priority; and an event controller re-running the microprocessor to process the events on the basis of the information in the registers in the generation of the events wherein the event register comprises:

an event priority register storing information on the processing priority of generated events for controlling transmission path of the event; and an event control register for storing information on approval for the transmission of the generated events.

2. The microprocessor of claim 1, wherein the event controller comprises:

an event responder transmitting the generated event into the microprocessor or responding to the generated event on the basis of the approval information stored in the event control register; and an event switch matrix determining the processing priority of the generated events on the basis of priority information stored in the event priority register and transmitting the determined processing priority information of the generated events to the instruction fetcher.

3. The microprocessor of claim 1, wherein the event-processing instruction set is realized to select or exclude predetermined events depending on whether or not to use of an operand.

4. The microprocessor of claim 3, wherein the event-processing instruction set comprises at least one instruction selected from the group consisting of:

an event register control instruction setting an event register;

an instruction suspending an operation of a microprocessor, accepting all events to process the events and processing event with higher priority;

an instruction suspending an operation of a microprocessor, selecting only predetermined events of the all events and processing the selected predetermined events;

an instruction suspending an operation of a microprocessor and processing all the events except for the predetermined events; and an event response instruction confirming that the events are completely processed.

5. The microprocessor of claim 1, wherein the microprocessor is operated in asynchronous circuit and system design methodologies using a handshaking technique without use of global clocks.

6. The microprocessor of claim 1, wherein the microprocessor is operated in at least one methodology, in addition to the asynchronous circuit and system design methodologies, selected from the group consisting of:

a dynamic voltage frequency scaling methodology applying a low power supply voltage to parts having low operating speed;

a power gating methodology interrupting a power supply to parts that are not used for a predetermined time; and a clock gating methodology suspending the supply of a global clock while supplying power to parts that are not used for a predetermined time.

7. An event-processing method using a microprocessor based on an event-processing instruction set, the event-processing method comprising:

setting an initial environment of the microprocessor;

performing an initial task according to the set initial environment;

performing setting of events to be used when the initial task is completed;

executing a program of the microprocessor according to order of fetched instructions when the setting of the events is completed;

suspending program of the microprocessor and waiting for the generation of a new event by turning the program of the microprocessor into an environment where the microprocessor accepts the events when the event-processing instruction is fetched and executed during the execution of the program;

processing the events through a predetermined event handler of an event handler table when the events are generated, depending on the delivery of the events and the event processing priority; and waiting for the generation of a new event by executing next event-processing instruction when the next event-processing instruction is generated after the completed processing of the event.

8. The event-processing method of claim 7, wherein the waiting of the generation of a new event includes: suspending all operations of the microprocessor after all the instructions being now executed is completely executed by executing the event-processing instruction.

9. The event-processing method of claim 7, wherein the processing of the events includes: re-running the microprocessor that has been in a waiting state when the events are generated.

10. The event-processing method of claim 7, wherein the program is executed normally when the next event-processing instruction is not generated.

* * * * *